United States Patent Office 2,919,986
Patented Jan. 5, 1960

2,919,986
PUFFED GOODS MIX

Ernest W. Johnson, Minneapolis, Minn., assignor to General Mills, Inc., a corporation of Delaware No Drawing. Application December 17, 1956
Serial No. 628,518

8 Claims. (Cl. 99—94)

The present invention relates to a dry mix composition suitable for the production of puffed goods. Typical puffed goods items which may be prepared from this mix include cream puffs, eclairs, hors d'oeuvre puffs, and French crullers.

Heretofore such puffed goods have been prepared in the home or in the bakery from a typical recipe such as the following: One cup of water and one-half cup butter are heated in a sauce pan and brought to a rolling boil. Then one cup of sifted flour is added and the mixture stirred vigorously over a low heat until the mixture leaves the sides of the pan and forms into a ball. The pan is then removed from the heat and four eggs are added, one at a time with beating between the additions of the eggs. The beating is continued until the mixture becomes smooth and velvety, after which spoonfuls are dropped onto a greased baking sheet. The material is then baked until dry and allowed to cool slowly. From this recipe approximately eight large size cream puffs are obtained.

As is seen from the above description the recipe is quite involved and cumbersome. The step in which the flour, water, and fat are cooked is critical because the starch in the flour must be gelatinized to the proper degree and the enzymes in the flour must be inactivated. As a result, these puffed goods are produced in the home only infrequently notwithstanding the fact that the finished product has considerable consumer appeal.

Various attempts have been made to convert a recipe of this type into a dry mix so that the housewife or the baker can merely add liquid to convert the mixture into a dough ready for baking. Typical of these attempts are the patents to Kipnis, 2,567,815 and 2,684,302. Patent 2,567,815 is concerned with a process in which flour is gelatinized in the presence of a minor proportion of shortening. After the mix has been cooled, eggs and milk are added to produce a dough or batter which is subsequently dried. The 2,684,302 patent is directed to a process in which flour is gelatinized in the absence of shortening after which the flour is dried and ground. This prepared flour may be converted into a dough or batter for cooking by the addition of shortening, eggs, and liquid. While these patents attempt to produce a dry mix which eliminates the necessity for gelatinizing the flour in the home or in the bakery, they still leave much to be desired. The gelatinized flour which is subsequently dried is prone to develop rancidity. This is evidenced by odor and by an increase in the peroxide values. A more important objection to this type of product, however, is that it requires a large amount of liquid, since all of the starch in the cereal portion of the mix has been gelatinized. The resulting puffed goods have markedly lower volumes and do not bake out as well as desired. The interior of the product is much more webbed than desired and in this respect is somewhat similar to the interior of cream puffs prepared by a typical home and bakery recipe.

By means of the present invention it is possible to produce improved products over those described in the Kipnis patents and over those produced according to the typical home or bakery recipe. The products have greater volume and their interior structure is more nearly that desired in a product of this type. In addition, because of the increased volume of the baked product, less of the baked product is used in relation to the filling and accordingly there is less tendency for the normal eggy flavor of these puffed goods to be carried over into the filled product.

It is therefore an object of the present invention to provide a novel mix for puffed goods capable of producing improved puffed goods. It is the further object of the present invention to provide a novel process for producing such a mix.

The present invention is based on the discovery that an improved mix can be prepared by substituting a mixture of (1) gelatinized starch or flour and (2) ungelatinized starch (either modified or unmodified), for the gelatinized flour used heretofore. By keeping part of the starch in the ungelatinized form, it is possible to control the absorption of the mix and get a baked product of improved volume and internal structure. For the ungelatinized starch portion ordinary flour cannot be used because of enzymes indigenous to flour. Active enzymes in the mix tend to develop rancidity in the mix, to liquify the batter, and to result in undue browning of the baked product. Flour in which the enzymes have been inactivated may be used.

The present formula for making puffed goods therefore includes a pregelatinized starch component and a second starch component which may be either unmodified or modified by treatment other than gelatinization. Preferably the starch is modified as for example, by oxidation or acid treatment. Another essential component of the formula is shortening, which may be in the form of liquid oils or plastic shortenings such as lard, hydrogenated animal or vegetable oils or a product derived by combining natural oils, either with, or without emulsifiers. It is preferred, however, to use oils or plastic fats which contain emulsifiers such as monoglycerides and diglycerides of fatty forming acids either with or without added lecithin.

In addition to the above essential components the formula usually includes certain optional minor constituents such as salt (primarily for flavor) and may contain leavening, sugar, corn syrup solids, gum gluten, locust bean gum, invert sugars, dextrins, etc. (desirable for the adjustment of batter characteristics, mix tolerance, volume and color of baked product).

It will be evident that the essential components of a dry mix are the gelatinized starch, ungelatinized starch, and shortening. It will be evident that a complete mix may be made by including egg solids and certain of the minor constituents referred to above. Obviously, the minor constituents may be omitted and may be added at the time of baking without any material difference or lessening of the convenience factor involved in the mix. The same is true of the egg component. Generally an improved baked product can be made when fresh whole eggs are added to the batter rather than by the inclusion of dried whole eggs in the mix. However, baked products of acceptable quality can also be produced when dried egg solids are incorporated in the mix.

It will be appreciated that a reasonable variation may be made in the relative proportions of the components of the mix, depending on the type of baked product desired. Thus variations may be made in the ratio of pregelatinized starch to the ungelatinized starch to the shortening, but the ratio of mix to liquid must also be changed in the recipe to compensate for changes made in the formula. A preferred formula is composed of approximately 40 percent shortening, 30 percent gelatinized starch, and 30 percent of ungelatinized starch. Whole egg solids may be incorporated in the above mix on the basis of 20 percent by weight based on the weight of the above three component mixtures. If whole fresh eggs are used they would be added on the basis of 90 percent by weight based on the above three component mixtures. The gelatinized starch portion may vary from 25 to 45 percent, the ungelatinized starch portion from 25 to 45 percent, and the shortening from 15 to 60 percent with the provision that the total starch fraction shall comprise between 40 and 80 percent.

In forming the batter the added liquid is largely absorbed by the gelatinized starch. It is therefore evident that if the portion of gelatinized starch is increased liquid must also be increased and if the portion of gelatinized starch is decreased liquid must be decreased. Since the liquid may be added as fresh whole eggs or water it is apparent that an increase in the amount of one component must be accompanied by a decrease in the second. Whereas the amount of fresh whole eggs may be varied from 60 percent to 120 percent based upon weight of dry mix. Best results are achieved when the weight of fresh eggs (or whole egg equivalent) is equal or slightly less than weight of dry mix. As fat has lubricating or fluidizing properties the amount present may influence liquid absorption but not to the extent of the above mentioned components.

For the gelatinized component any cereal or tuberous flours or starches as corn, wheat, rice potato, tapioca, waxy maize, waxy sorghum, arrowroot, and the like may be used. For the non-gelatinized component a wide variety of modified or unmodified starches or flours may be used, except that they must be free of enzymes and usually are of the type which may be characterized as high fluidity film-forming starches. Some starches possess these characteristics in either natural or modified form while others appear to possess these characteristics only after modification. Wheat, corn tapioca, waxy maize, and waxy sorghum have some of the film-forming characteristics in their unmodified form. However, these are improved by a proper degree of modification such as by acid treatment but preferably by oxidation. Other starches such as rice and potato in their unmodified form do not appear to possess these film-forming characteristics but develop these characteristics on modification as described above. A fairly high fluidity is desired in this starch, preferably a fluidity (by corn industries funnel method) of 80 or more although starches with a fluidity of 60 or even 40 may be satisfactory but generally require the addition of one or more of the adjuncts mentioned above.

In preparing the mix the gelatinized starch may be prepared in any convenient manner. It is preferred, however, to have the product in a finely divided form. Thus it is preferred to dry the gelatinized starch in the form of a thin flake having thickness of about 0.002 to 0.003 inch and then to grind these flakes to a degree where at least or about 30 percent will pass through a number 170 U.S. standard sieve. The granulation of the non-gelatinized component is not critical; however, from the standpoint of mix manufacture those starches which are available in discrete granule form are most satisfactory.

The mixing operation is conducted very simply by introducing the components of the mixture into any conventional equipment and there mixing the ingredients until substantial uniformity is obtained. The product may be packed in conventional equipment and in conventional packages.

EXAMPLE I

A series of dry mix products were prepared with the following formula:

| | Percent |
|---|---|
| Shortening | 40 |
| Gelatinized starch fraction | 30 |
| Ungelatinized starch fraction | 30 |
| Salt | Trace |

These dry mix products were converted into batters by the addition of water and fresh eggs. Cream puffs were then baked from this batter using 31 grams of the batter for each puff. The puffs were then baked and their volume measured by rape seed displacement. The products were also examined for other physical properties including the shape of the void, the color of the product, and the symmetry of the puff. Based on the volume, the void, the color, and the symmetry, an overall rating of the puffs was made using the following rating code:

E—Excellent
G—Good
F—Fair
P—Poor

For comparative purposes a product was also made in which wheat flour was used for the gelatinized portion and wheat flour containing the usual natural enzymes was used for the ungelatinized fraction. Another product was prepared in which all of the starch meaterial was gelatinized wheat flour, another in which all the starch material was wheat starch, and a further product was made according to the cookbook recipe referred to above. In the case of these last three products the quantity of water employed was increased because of the increased absorption of the larger quantity of gelatinized starch. The results are indicated in the following table:

Table I.—Effect of cereal variations in formulas

| Gelatinized Fraction | Ungelatinized Fraction | Vol.[1] | Rating | Comments |
|---|---|---|---|---|
| Wheat starch | Oxidized corn starch | 440 | E | Good volume; large dry void; golden color; symmetrical round shape. |
| Do | Waxy maize starch | 410 | G | Dull crust color; filaments; irregular shape. |
| Do | Waxy sorghum | 390 | G | Sl. dull crust color; less volume; flat top. |
| Do | Modified waxy sorghum | 385 | G | Less volume. |
| Do | Tapioca starch | 420 | G | Sl. dull crust color; thin crust. |
| Do | Oxidized potato starch | 415 | G | Less volume. |
| Do | Oxidized corn starch | 365 | F | Less volume, filaments; irregular shape. |
| Wheat flour | do | 450 | G | Soggy interior. |
| Tapioca | Tapioca | 520 | G | Soggy interior; dark crust color; crust too thin and fragile. |
| Do | | | | |
| Corn starch | Oxidized corn starch | 430 | E | Good volume; large dry void; golden color; symmetrical rounded shape. |
| Wheat flour | Wheat flour | 440 | P | Very dark crust color; burnt-like flavor. |
| 100% wheat flour | | 310 | P | Less volume; dark brown crust; soggy interior; filaments; irregular shape. |
| 100% wheat starch | | 340 | F | Irregular shape; less volume. |
| Cookbook formula | | 250 | P | Irregular shape; filaments; soggy. |

[1] Volume in cc. based on two cream puffs, taken by rape seed displacement; scaling weight—31 grams batter for each cream puff.

It is evident that the preferred products are those in which a pure starch is used both in the gelatinized fraction and in the ungelatinized fraction. Moreover, the oxidized starch is preferred for the ungelatinized fraction. Products 1 and 10 illustrate this superiority not only in volume but also in the nature of the void, the symmetry of the product, and its color. Other products such as 7, which includes wheat flour in the gelatinized fraction are less desirable because of reduced volume and poorer physical characteristics of the baked product. Even this product, however, is superior to comparative product 11 in which wheat flour was used throughout. While this latter product had acceptable volume, it had a very dark color, and a burnt flavor, which, in large part, may be attributed to the enzymes present. Products 12, 13 and 14, in which all the starch was gelatinized, are definitely inferior for the reasons noted.

EXAMPLE II

In order to demonstrate the variation possible in the shortening level, a series of products were prepared containing equal weights of pregelatinized corn starch and oxidized corn starch and in which the shortening varied from 15 to 60 percent based on the total weight of the mix. These products were compared with comparable products made entirely from gelatinized flour. The results are indicated in the following table:

*Table II-A.—Effect of quantity of shortening in cream puffs using equal parts of pregelatinized corn starch and oxidized corn starch*

| Percent Shortening | Vol. | Rate | Comments |
|---|---|---|---|
| 15.00 | 350 | F | Very irregular; less volume; filaments. |
| 50.00 | 450 | E | Good volume; large dry void; golden color; symmetrical rounded shape. |
| 60.00 | 400 | G | Flat irregular shape; less volume. |

*Table II-B.—Effect of quantity of shortening in cream puffs using 100 percent pregelatinized flour*

| Percent Shortening | Vol. | Rate | Comments |
|---|---|---|---|
| 15.00 | 230 | P | Irregular knobby shape; soggy; filaments. |
| 50.00 [1] | 250 | P | Symmetrical rounded shape; soggy; filaments. |
| 60.00 | 240 | P | Do. |

[1] Actual cookbook recipe.

It is evident that the products made according to the present invention are definitely superior to those made entirely from gelatinized flour. These data also show that it is preferred to have a relatively high shortening level. The products with the lower shortening level are less desirable for cream puffs but are preferred for such products as French crullers.

EXAMPLE III

A series of mixes were prepared in which the ratio of gelatinized to ungelatinized starch was varied. The mixes were converted into batters and baked as described above. The results are indicated in the following table:

*Table III.—Effect of ratio of pregelatinized fraction to ungelatinized fraction*

| Cereal Fraction, Percent | Vol. | Rate | Comments |
|---|---|---|---|
| 45% Pregelatinized corn starch; 15% Ungelatinized oxidized corn starch. | 380 | F | Less volume; slightly irregular. |
| 30% Pregelatinized corn starch; 30% Ungelatinized oxidized corn starch. | 450 | E | Good volume; large dry void; golden color; symmetrical rounded shape. |
| 15% Pregelatinized corn starch; 45% Ungelatinized oxidized corn starch. | 380 | F | Flat top; irregular shape. |

It will be noted that the best product was obtained when the gelatinized and ungelatinized starches were used in equal quantity. Where either of the starches was used in excess the bake product was somewhat inferior although still superior to the conventional product as will be seen from a comparison with some of the previous examples.

It will be seen from the above examples that the present invention provides a means of improving the volume, color, and shape characteristics of the baked products as compared with methods currently employed. The extent of improvement depends upon the particular starches employed and the relative proportions. By means of the present invention, it is possible to prepare mixes having optimum properties for each of the various puffed goods conventionally made such as cream puffs, eclairs, French crullers, and the like.

I hereby claim as my invention:

1. A puffed goods mix comprising (1) a gelatinized starch component selected from the group consisting of gelatinized starch and gelatinized flour, (2) an ungelatinized high fluidity film-forming oxidized starch component substantially free from enzymes, and (3) shortening.

2. A puffed goods mix comprising from 25 to 45 percent of a gelatinized starch component selected from the group consisting of gelatinized starch and gelatinized flour, from 25 to 45 percent of an ungelatinized high fluidity film-forming oxidized starch component substantially free from enzymes and from 15 to 50 percent of shortening, the total starch components comprising between 50 and 80 percent by weight of the mix.

3. A puffed goods mix comprising approximately 30 percent of gelatinized starch, 30 percent of ungelatinized high fluidity film-forming oxidized starch, and approximately 40 percent shortening.

4. A product according to claim 1 in which the mix also includes dry egg solids.

5. A product according to claim 1 in which the gelatinized starch component is in the form of thin flakes having a thickness of approximately 0.002 to 0.003 inch and in which the flakes have been reduced to a fineness such that at least 30 percent will pass through a 170 U.S. standard sieve.

6. A product according to claim 1 in which the starch components are derived from cereal grains.

7. A product according to claim 3 in which one starch is wheat starch and the other is corn starch.

8. Product according to claim 1 in which the ungelatinized starch is oxidized corn starch.

References Cited in the file of this patent
UNITED STATES PATENTS

| | | |
|---|---|---|
| 2,567,815 | Kipnis | Sept. 11, 1951 |
| 2,684,302 | Kipnis | July 20, 1954 |
| 2,785,980 | Washburn | Mar. 19, 1957 |
| 2,796,350 | Grennan et al. | June 18, 1957 |

OTHER REFERENCES

Lord: "Everybody's Cook Book," 1924, published by Henry Holt & Co., New York, page 407.